United States Patent [19]

Ottenheimer

[11] 4,272,177
[45] Jun. 9, 1981

[54] MULTIPLE CAMERA MOUNTING BRACKET

[76] Inventor: Charles J. Ottenheimer, 2454 Paradise Village Way, Las Vegas, Nev. 89120

[21] Appl. No.: 153,446

[22] Filed: May 27, 1980

[51] Int. Cl.³ .......................................... G03B 17/56
[52] U.S. Cl. .................................................. 354/293
[58] Field of Search ............... 354/288, 293, 82, 113, 354/126, 132, 110

[56] References Cited

U.S. PATENT DOCUMENTS

| | | | |
|---|---|---|---|
| 2,140,050 | 12/1938 | Hart | 354/82 X |
| 2,458,466 | 1/1949 | Campbell | 354/113 |
| 2,753,778 | 7/1956 | Tolcher | 354/82 X |
| 2,949,838 | 8/1960 | Skalabrin | 354/293 |
| 3,550,519 | 12/1970 | Lewis | 354/293 |
| 3,575,098 | 4/1971 | Jones | 354/293 |
| 3,855,602 | 12/1974 | Hoos | 354/293 |
| 3,893,145 | 7/1975 | King | 354/293 |
| 3,984,855 | 10/1976 | Bacznsky | 354/293 |

Primary Examiner—Donald A. Griffin

[57] ABSTRACT

A mounting bracket for holding a plurality of cameras has two vertically spaced parallel camera mounting shelves separated by a pair of hand grips located at the ends of the shelves. The mounting shelves are flat, elongated members, each having an angled end portion such that in use one grip is offset forwardly from the other. A series of attachments, such as extension arms for mounting flash accessory shoes, may optionally be mounted on the basic bracket. In another modification, the upper camera mounting shelf may be pivotally mounted on the grips to permit focusing of the upper and lower cameras on the same object. The bracket may be carried with a shoulder strap or may be mounted on a tripod.

12 Claims, 6 Drawing Figures

MULTIPLE CAMERA MOUNTING BRACKET

BACKGROUND OF THE INVENTION

Both amateur and professional photographers frequently find a need to carry more than one camera for specific situations. For example, a photographer may wish to shoot the same subject with normal, wide angle, the telephoto lenses, but may not wish to take the time to interchange these lenses at the moment of shooting. Similarly, a photographer may wish to have the option of shooting pictures in either black-and-white or color film, or with a variety of different lens filters. In some instances, a photographer will simply wish to have the ability of taking a very large number of exposures without having to reload the film in the camera at the time of shooting. As a result, it is common to see a photographer having two or more cameras draped over his shoulder, the cameras being selected, focused, and shot selectively.

Although carrying multiple cameras provides a certain degree of flexibility to the photographer in the availability of different types of films, lenses, or filters, it is quite cumbersome to switch from one camera to another, and it is difficult to make the switch rapidly. If the cameras are carried without protective cases, the cameras may bump or scrape together during carrying and use, causing expensive damage.

The multiple camera bracket of the invention has been created to provide a substantial degree of flexibility to the photographer in selection of films, lenses, and filters, and to enable a virtually immediate change from one camera to another. In addition, the bracket of the invention provides an easy storage and carrying apparatus for the cameras. Also, the bracket is adapted to carry a wide variety of other accessories, such as flash attachments.

The basic bracket of the invention consists of two vertically spaced parallel camera mounting shelves which are separated by a pair of handles, or grips, which extend vertically between the shelves and their ends. The mounting shelves are flat rigid members having an angled end portion such that when the photographer holds the bracket properly, the right hand grip is slightly offset forwardly from the left hand grip. The offset grip provides easy access to the film advance levers of both the upper and lower cameras. The bracket can be carried by means of a shoulder strap or may be mounted on any standard photographic pod, such as a tripod, unipod, or the like. For larger models of the bracket, using 4, 6, or more cameras, a tripod mount is most convenient and permits a photographer to shoot over a very extended period without being concerned with reloading of film and thereby possibly missing important photos. When tripod mounted, with flash arms attached as shown in FIG. 6, the bracket can be used as a remote light stand with no cameras mounted. Light-activated "slave" strobe lights are mounted on the arms, permitting a variety of lighting patterns.

Extensions which may easily be secured to the basic bracket also provide the photographer with multiple flash capability, wherein various flash units and "slaves" (flash units actuated by the light from primary flash units) may be aimed in various directions and from various locations on the bracket, thereby providing a lighting system having many of the important features of a studio lighting system.

Through the use of an optional pivoted mounting shelf which replaces the top or bottom flat mounting shelf, the upper and lower cameras may be focused precisely on the same subject. Through the use of simultaneous focus and simultaneous exposure, a pair of photographs may be obtained which, with the use of a special optical viewing system, will provide the viewer with a three dimensional image. Further, through use of the pivoted shelf, a photographer can take identical photographs of the same subject, employing the same or different films, lenses, filtration, or A.S.A. ratings.

Various types of camera mounts are of course well known. Unipods, tripods, shoulder pods, and chest pods are examples of camera support devices. Some types of supports, such as that shown in Tolcher, U.S. Pat. No. 2,753,778, and Hart, 2,140,050, also provide the capability of remote actuation or control of the various camera functions. However, no multiple camera mounting bracket providing the features and flexibility of the bracket of the invention is known to the inventor.

Accordingly, it is an object of the present invention to provide a bracket for carrying at least two cameras which permits a user to rapidly operate either camera. It is a further object of the invention to provide a photographer with the flexibility to shoot pictures with different types of film, lenses or filters, or with different camera settings, with a minimum of expenditure of time and effort. It is a further object of the invention to provide a multiple camera mounting bracket which permits the unobstructed manual advance of film for each camera. Another object of the invention is to provide a bracket for multiple cameras which enables simultaneous actuation of two or more cameras from one handle. It is still a further object of the invention to provide a mounting bracket for multiple cameras which provides remote actuation of each camera from the handles of the mounting bracket, such that a user can simultaneously grip both handles of the bracket and actuate both cameras. It is a still further object of the invention to provide a bracket having the flexibility to receive multiple accessories, such as flash attachments, which may be actuated at a distance from the camera. These and other objects of the invention will be clear to one skilled in the art from the following detailed description of several specific embodiments of the invention.

BRIEF SUMMARY OF THE INVENTION

Apparatus for mounting a plurality of portable cameras comprises a first mounting shelf vertically spaced from and substantially parallel to a second mounting shelf, said first and second mounting shelves comprising flat elongated members each having an end portion angled from between about 10° C. to about 90° C. with respect to said member, first and second mounting means for removably securing a camera to each mounting shelf, and a pair of spaced parallel hand grips vertically fastened between the mounting shelves. Additional and optional features of the invention comprise at least one horizontal arm pivotally mounted on the bracket, and mounting means on said arm for attaching a flash unit. Remote camera actuation means may be integrally carried by each of the grips.

BRIEF DESCRIPTION OF THE DRAWINGS

The invention is best understood with respect to the drawings, in which.

DETAILED DESCRIPTION OF A PREFERRED EMBODIMENT

Figure 1:
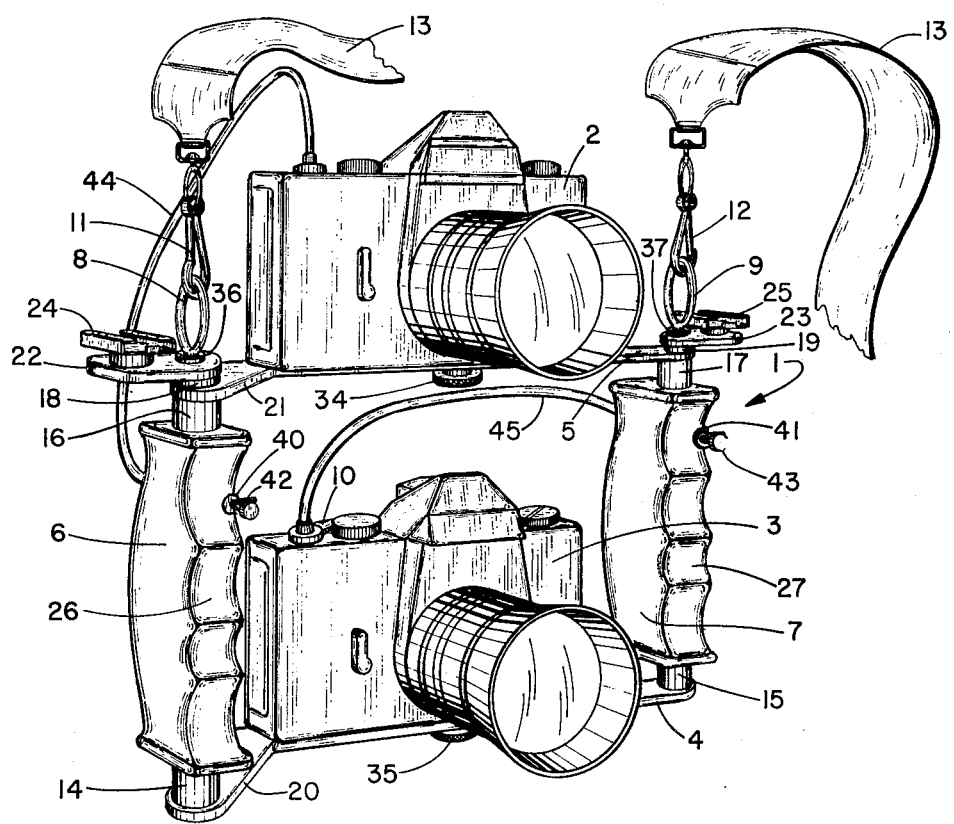
FIG. 1 is a perspective front view of the mounting bracket of the invention having 2 35 mm cameras mounted thereon.

The basic model of the camera holding bracket of the invention accommodates two cameras. A bracket having two 35 mm cameras mounted in vertically displaced position is shown in FIG. 1. As shown in the drawing, bracket 1 has cameras 2 and 3 mounted thereon. The bracket consists of two spaced substantially parallel camera mounting shelves 4 and 5, which consist of flat elongated rigid metal strips having angled end portions 20 and 21, respectively. The brackets are held in spaced relation by a pair of rubber molded grips or handles 6 and 7, mounted vertically and parallel to each other between opposing ends of the camera mounting shelves 4 and 5. The distance between the mounting shelves is adjusted by the use of annular spacing sleeves 14, 15, 16, and 17; these sleeves may be adjusted in height or may be eliminated entirely depending upon the height of the grips and the particular desired distance between the upper and lower shelves. The distance between the shelves may vary, e.g., with size of the cameras being used. If desired, a third parallel shelf can be added.

The offset of end portions 20 and 21 of the shelves is a particularly important feature of the invention which permits the user to easily operate the winding mechanism of the lower camera without obstruction from the upper shelf. The angle of offset is from about 10° to about 90°, preferably from about 25° to about 75°; as shown, the angle is about 45°.

The bracket is held together by a pair of long eye bolts 8 and 9 which extend through bores in the ends of the mounting shelves, the spacing sleeves, and the grips. The eye bolts each have a threaded end which exits the bracket through a bore at the end of the lower shelf 4, and is fastened there by acorn nuts (not shown). The function of the acorn nuts is simply to secure the eye bolts and the various parts held thereby to substantially prevent relative movement of the parts around the eye bolt shaft. The acorn nuts have a smooth outer finish which is somewhat decorative and covers the threaded end of the bolt, thereby precluding any damage which might be caused by marring or scratching of a surface on which the mounting bracket is placed. In principle, any type of fastening nut can be used.

The camera mounting bracket is easily portable and may be carried by means of a continuous shoulder strap 13, which is removably fastened to the brackets with clip fasteners 11 and 12 which engage the eyes of eye bolts 8 and 9. When properly assembled, the mounting bracket is quite rigid, and may also be carried by the grips or handles. If desired, the cameras may be stored on the mounting bracket, simply using the strap to hang the bracket and cameras on a hook or the like.

Also shown mounted on the eye bolts 8 and 9 in FIG. 1 are a pair of washers or shims 18 and 19 and a pair of arms 22 and 23 which carry accessory flash shoes 24 and 25 at their outer extremity. Shims 18 and 19 are simply spacers, and may be removed as additional accessories (such as flash arms 22 and 23) are added to the basic bracket. Similarly, if the flash arms are removed from the bracket, additional shims may be added to maintain rigidity of the various components mounted on the eyebolt shaft. By adding and subtracting shims, the frictional resistance of the various components mounted on the eye bolt are such that the grips and the accessory arms may be rotated or pivoted about the eye bolt shaft, but do not rotate freely. The frictional resistance permits the accessory arms 22 and 23 to be rotated around the eye bolt to any desired angle; however, once a flash attachment is mounted on the accessory shoe, the frictional resistance keeps the arm from further rotation and permits the flash to be directed according to the preset desires of the photographer. When the flash arms are removed, an additional shim having the same thickness as the arm is used in its place to maintain rigidity. The frictional resistance along the eyebolt shaft is maintained by tightening the acorn nut, compressing the components mounted on the eyebolt shaft against an annular ring or ledge 36 and 37 (best seen in FIGS. 2 and 3) which is cast integral with or welded to the eyebolt.

Figure 2:
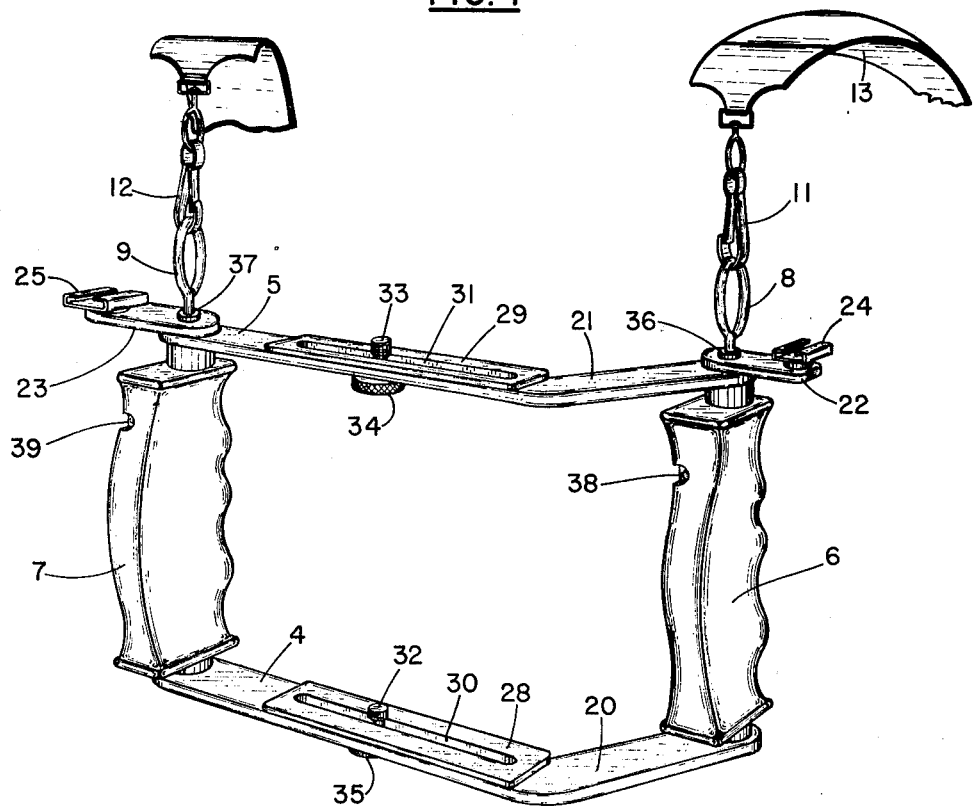
FIG. 2 is a partial rear perspective view of a bracket of the invention.

FIG. 2 shows a rear view of a mounting bracket according to the invention, without the cameras being mounted thereon. In this view, the mechanism for mounting the cameras on the bracket is easily seen. Thin rubber mounting mats or pads 28 and 29 are attached to the upper surfaces of camera mounting shelves 4 and 5. These pads are glued to the shelves with an adhesive, and are rectangular members extending longitudinally along the shelves, with a width substantially equal to the width of the shelves. These pads protect the bases of the cameras from scratches, mars, or abrasions which may occur as a result of contact between the bottom of the camera and the mounting shelf. The rubber pads, further, prevent slipping of the camera and ensure that, once mounted, the position of the camera will not change. Longitudinal slots 30 and 31 in the rubber pads are coextensive with similar slots in the mounting shelves. Camera lug bolts 34 and 35 having threaded ends 33 and 32, respectively, which ends are adapted to threadedly engage standard female fittings on the bottom of most cameras. In the embodiment of the invention shown in FIG. 2, the neck portion of the camera lug bolt between the thumb screw grip and the threaded end is of smaller diameter than either end, permitting the camera lug bolt to slide longitudinally along the slot without slipping out. A threaded hole having a diameter slightly greater than the slot is centrally located in the slot, permitting removal of the camera lug bolt from the bracket by engaging the threaded end of the lug bolt in the hole and turning it in a counterclockwise direction. This is a conventional and well-known mechanism for mounting a camera and permits movement of the camera to various locations along the shelf. Alternative to the slotted shelf, a series of threaded holes may be placed along the portion of the shelves shown occupied by the slot which permits mounting of the camera at discrete intervals along the shelf.

Another extremely useful feature of the invention is the ability to shoot both cameras while holding the grips. As shown in FIG. 1, cable release mechanisms 40 and 41 are mounted in the handles 6 and 7, respectively, through bores in the grips along the depth of the grip, the bore being perpendicular to the length and width of the grip. The cable releases are conventional, and consist of cables 44 and 45 having one end connected to the shutter trigger on the camera, and having the other end mounted in bores 38 and 39 in the upper portion of the grips. The actuating plungers 42 and 43 of the cable release mechanisms extend forwardly of the scalloped front surfaces 26 and 27 of the grips, and are easily actuated by the left and right forefingers of the user.

Figure 3:
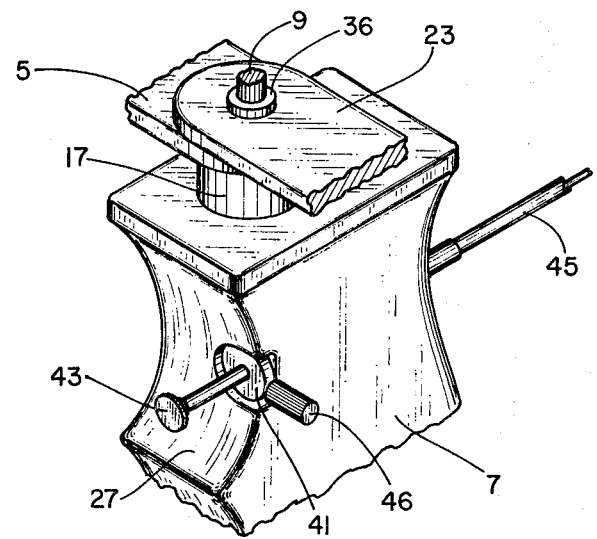
FIG. 3 is a partial view of a grip of the mounting bracket showing integration of a cable release system.

A more detailed view of the cable release mechanism is shown in FIG. 3. Grip 7, which is made from a hard rubber or plastic material, and which has a contoured front surface 27 to permit the user to grip the handle comfortably, has a bore through its width (not shown) through which the cable portion 45 of cable release mechanism 41 extends. A slight recess in the front portion of the handle permits a snug fitting of the cable release into the grip, and permits rotation of locking mechanism 46 which precludes accidental actuation of plunger 43. The cable release operates by pressing the actuating plunger inwardly toward the handle, thereby moving an internal wire axially along the cable sheath, depressing the camera shutter trigger. The cable release devices are conventional and commercially available.

Figure 4:
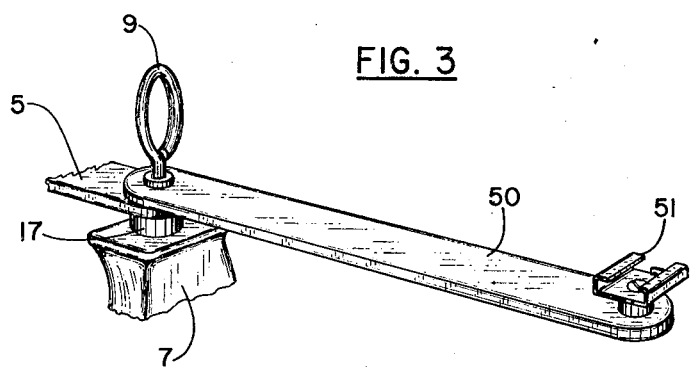
FIG. 4 is a partial view showing an extension arm of the invention for carrying a flash unit at a distance from the bracket.

A substantial advantage to the mounting bracket of the invention is the flexibility of modifying the basic bracket to serve different purposes. For example, the short accessory shoe arms shown in FIGS. 1 and 2 may be replaced with a longer arm, such as member 50 shown in FIG. 4. Arm 50 has a bore in one end through which the eye bolt is threaded for mounting on the bracket; an accessory shoe 51 is mounted on the opposite end of the arm. This arm may extend anywhere from a few inches to several feet away from the handles, and may carry a plurality of accessory shoes. The inventor has successfully used two mounting arms, each carrying three accessory shoes extending over a total width of about five feet. This enables flash attachments and slave units actuated by the flashes to project light onto the target from various directions, thus approximating studio lighting conditions. These arms may be pivoted about the eye bolts to obtain the desired direction of light projection.

Figure 5:
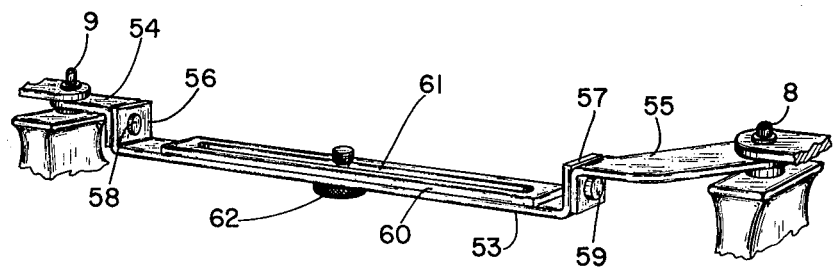
FIG. 5 shows a pivoted mounting shelf for permitting the user to select various vertical elevations of the subject.

A pivoted shelf bracket, which can be used to replace either lower camera mounting shelf 4 or upper shelf 5, is shown in FIG. 5. Through the use of this simultaneous focus bracket, the photographer can focus two or more cameras on precisely the same object. Using this device, the photographer presets and focuses one camera on the subject, and tilts the pivoted bracket until the second camera is directed to exactly the same scene. For still pictures, the multiple cable release system shown in FIG. 1 may be used; for action photography, a single button twin cable release device (not shown), but conventional) is used. Upon development, the two photographs may be placed in a viewer that will appear to create a three dimensional scene from the photographs. This shelf, known as the "simo-focus" shelf, consists of mounting brackets 54 and 55 attached to a center pivoted member 53. Brackets 54 and 55 have bores at one end thereof for mounting on the eye bolts, and have bored flanges at the other end for attachment to the vertical flanges 56 and 57 of shelf 53. Attachment is effected through screws 58 and 59, which provide the ability to tighten the shelf once the particular desired degree of attitude is obtained such that accidental movement is not possible.

Besides the two accessory flash arms which may extend from the top bracket, additional accessory arms may be mounted adjacent the ends of the bottom shelf at the base of each handle. One or more strobe lights and one or more slave activating units may be mounted on these accessory arms. The top and bottom arms may be used entirely independent of each other; one or more top or bottom arms may be used alone or in combination with any of the other arms. An example of a bracket having four lighting arms is shown in FIG. 6; this arrangement is appropriate for studio work.

Figure 6:
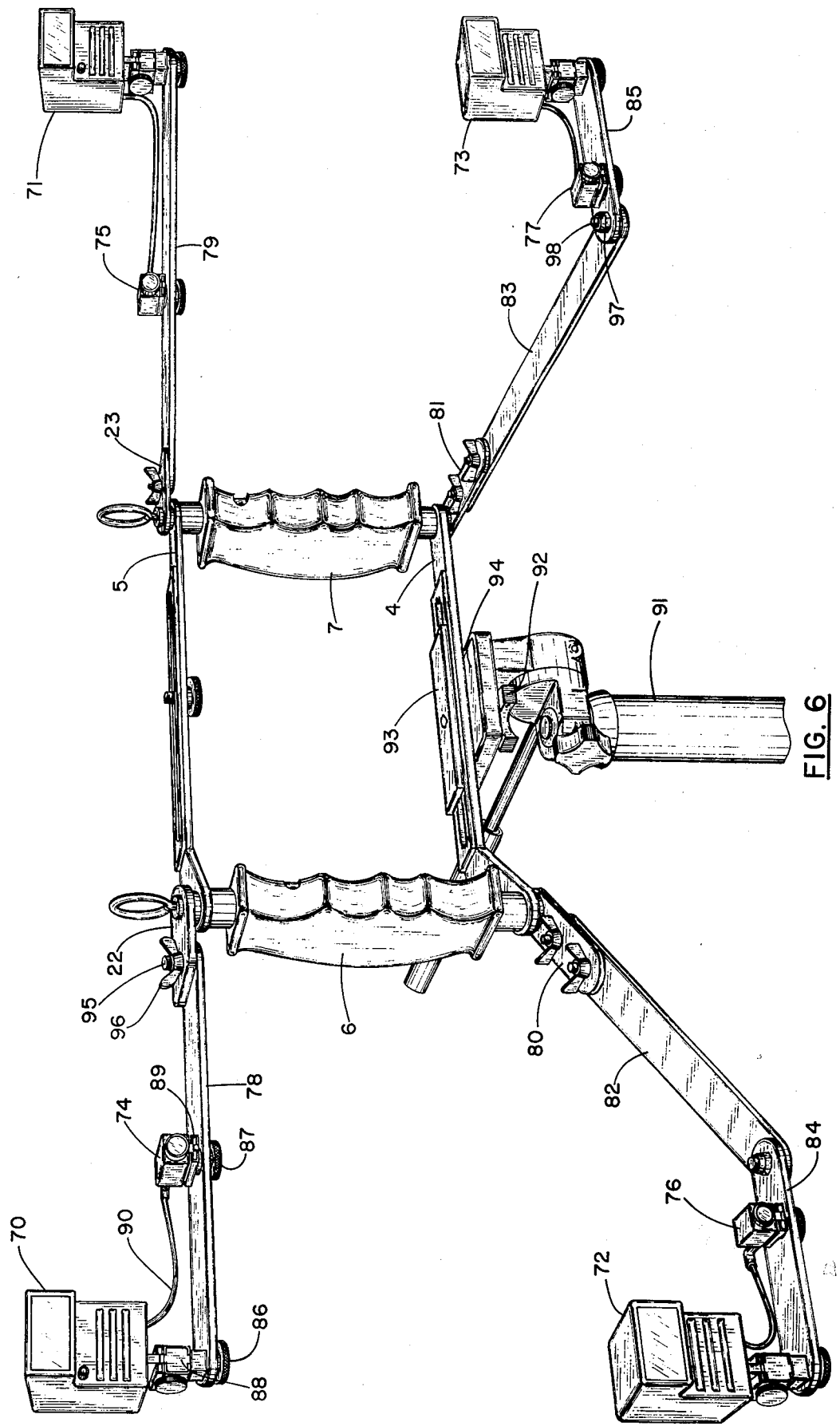
FIG. 6 shows a variation of my bracket adapted for studio use, with extensions for flash mounting at the top and bottom of the bracket.

FIG. 6 shows the bracket mounted on a conventional tripod 91 and equipped with four slave actuated units 70, 71, 72, and 73. The tripod is attached to the bracket by extension of the threaded portion of thumbscrew 92 through tripod platform 94, shelf 4, and mounting plate 93. Short mounting arms 22 and 23 are attached at the ends of upper shelf 5, and similar arms 80 and 81 are attached at the ends of lower shelf 4. Extension arms 78, 79, 82, and 83 are mounted at the ends of the short mounting arms by bolts and wing nuts, denoted for example as 95 and 96, respectively, fastening the extension 78 to arm 22.

At the upper portion of the bracket, slave units are mounted directly on mounting blocks, such as block 88 shown at the end of extension 78, attached with thumbscrews 86. Photocells 74 and 75, which activate the unit, are mounted in the middle portion of the extension. The photocells are mounted by means of a mounting bracket 89 and thumbscrew 87. Lower slaves 72 and 73 are shown having articulated extensions, with additional mounting arms 84 and 85 attached at the end of extensions 82 and 83. These additional mounting arms are attached, as shown by bolt 98 and nut 97, providing a frictional engagement which can be easily altered to permit swivelling of the slave to proper position. Photocells 76 and 77 are mounted similarly to the upper photocells. The photocells are connected to the slave units by leads, such as 90.

I claim:

1. Apparatus for mounting photographic equipment comprising
    (a) a first mounting shelf,
    (b) a second mounting shelf spaced from and substantially parallel to the first mounting shelf,
    (c) said first and second mounting shelves each comprising a flat elongated member having an end portion angled from between about 10° and about 90° with respect to said member,
    (d) first and second mounting means for removably securing a camera to each mounting shelf, and
    (e) a pair of spaced parallel hand grips fastened between the mounting shelves.

2. The apparatus of claim 1 wherein the first and second mounting shelves have an end portion angled from about 25° to about 75° with respect to said member.

3. The apparatus of claim 2 wherein the end portions are angled at about 45°.

4. The apparatus of claim 1 wherein each hand grip also comprises third mounting means for removably fastening a cable shutter release trigger.

5. The apparatus of claim 4 wherein the third mounting means comprises a bore extending through the hand grip perpendicular to the width and length of the grip.

6. The apparatus of claim 1 also comprising at least one extension member extending outwardly from and in the same plane as a mounting shelf, attachment means for removably fastening the extension member to the apparatus, and fourth mounting means for attaching photographic accessories to said extension.

7. The apparatus of claim 6 comprising two extension members extending outwardly from opposite ends of a mounting shelf.

8. The apparatus of claim 6 comprising four extension members, wherein two extension members extend outwardly from opposite ends of the first mounting shelf, and two extension members extend outwardly from opposite ends of the second mounting shelf.

9. The apparatus of claim 6 wherein each extension member has a bore in an end portion thereof adapted to receive a threaded pin fastening member.

10. The apparatus of claim 1 wherein one of the mounting shelves is pivotally mounted to permit angular adjustment of the shelf with respect to the other shelf.

11. The apparatus of claim 1 also comprising a carrying strap having the ends thereof removably attached to an upper portion of each grip member.

12. The apparatus of claim 1 wherein each hand grip has a lengthwise bore, and the apparatus also comprises a pair of threaded pin members, each extending sequentially through a bore in an end of a first mounting shelf, the bore in the hand grip, and a bore in an end of the second mounting shelf, said pin members being secured by fastening means.

* * * * *